United States Patent
Sousa et al.

(10) Patent No.: US 6,222,870 B1
(45) Date of Patent: Apr. 24, 2001

(54) PUMPED LASER DIODE ASSEMBLY WITH OPTICALLY COUPLED HEAT SINK

(75) Inventors: John Gary Sousa, Hudson; Josh P. Foster, Windham, both of NH (US)

(73) Assignee: Presstek, Inc., Hudson, NH (US)

( * ) Notice: Subject to any disclaimer, the term of this patent is extended or adjusted under 35 U.S.C. 154(b) by 0 days.

(21) Appl. No.: 09/334,486

(22) Filed: Jun. 16, 1999

Related U.S. Application Data

(60) Provisional application No. 60/121,159, filed on Feb. 22, 1999.

(51) Int. Cl.$^7$ .................................................... H01S 3/00
(52) U.S. Cl. ................... 372/75; 372/70; 372/34
(58) Field of Search ..................... 372/69, 70, 34, 372/75

(56) References Cited

U.S. PATENT DOCUMENTS

| | | | |
|---|---|---|---|
| H1673 | * 8/1997 | Hanson | 372/34 |
| 5,612,969 | * 3/1997 | Dombi | 372/75 |
| 5,822,345 | * 10/1998 | Sousa et al. | 372/75 |
| 5,825,803 | * 10/1998 | Labranche et al. | 372/75 |

* cited by examiner

*Primary Examiner*—Leon Scott, Jr.
(74) *Attorney, Agent, or Firm*—Testa, Hurwitz & Thibeault LLP

(57) ABSTRACT

Individually addressable laser crystals are optically coupled to a single slab of an optical carrier that transmits substantially without distortion. The crystals are separate for thermomechanical isolation but may be closely spaced (generally on the order of 0.003 inch apart), and may originate as a single crystal cut into separate segments.

12 Claims, 2 Drawing Sheets

PUMPED LASER DIODE ASSEMBLY WITH OPTICALLY COUPLED HEAT SINK

RELATED APPLICATION

This application stems from U.S. Ser. No. 60/121,159, filed on Feb. 22, 1999.

FIELD OF THE INVENTION

The present invention relates to digital printing apparatus and methods, and more particularly to a system for imaging of recording media such as lithographic printing members.

BACKGROUND OF THE INVENTION

It is important, when focusing laser radiation onto many types of recording medium, to maintain satisfactory depth-of-focus—that is, a tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that can accompany normal use. Depth-of-focus is maximized by keeping output beam divergence to a minimum.

Optical efforts to reduce beam divergence also diminish power density, since a lens cannot alter the brightness of the radiation it corrects; a lens can only change the optical path. Thus, optical correction presents an inherent tradeoff between depth-of-focus and power loss. U.S. Pat. No. 5,822,345 discloses an approach that utilizes the divergent output of a semiconductor or diode laser to optically pump a laser crystal, which itself emits laser radiation with substantially less beam divergence but comparable power density; the laser crystal converts divergent incoming radiation into a single-mode output with higher brightness. The output of the laser crystal is focused onto the surface of a recording medium to perform the imaging function.

The arrangements described in the '345 patent employ a separate crystal for each diode pumping source. This is ordinarily necessary due to the nature of laser crystals and their operation. In the absence of optical excitation, resonant cavities formed from these optical-gain crystals are flat-flat monoliths; when optical power is delivered to an end face of such a crystal, however, this and the opposed face bow—an effect called bulk thermal lensing. To obtain a single transverse mode of operation (preferably the lowest-order, fundamental $TEM_{00}$ mode), with the output divergence as close as possible to that of a diffraction-limited source, the crystal must be implemented in a design that accounts for bulk thermal lensing.

This phenomenon makes it even more difficult to obtain multiple, independent outputs from a single laser crystal. Even if the energy of each pumping source is confined to a discrete region on one of the crystal faces, the thermal lensing action required for lasing in one region will ordinarily affect the other regions, resulting in mutual interference. This condition is known as "thermal crosstalk." Accordingly, the current state of the art prescribes the use of a separate crystal for each laser channel, resulting not only in added cost for the crystals and their mounts, but also for separate focusing assemblies.

U.S. Ser No. 09/245,102, filed on Jan. 25, 1999 (the entire disclosure of which is hereby incorporated by reference) describes configurations that permit a single laser crystal to be driven by multiple pumping sources to obtain discrete, collimated outputs without substantial thermal crosstalk.

FIG. 1 illustrates a generalized configuration as disclosed in this earlier-filed application. A recording medium 50, such as a lithographic plate blank or other graphic-arts construction, is affixed to a support during the imaging process. In the depicted implementation, that support is a cylinder 52 around which recording medium 50 is wrapped, and which rotates as indicated by the arrow. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components may be mounted in a writing head for movement on a lead screw and guide bar assembly that traverses recording medium 50 as cylinder 52 rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with a series of pumping laser diodes 60, four of which are representatively designated $D_1$, $D_2$, $D_3$, $D_4$. The optical components concentrate laser output onto recording medium 50 as small features, resulting in high effective power densities. A controller 65 operates a series of laser drivers collectively indicated at 67 to produce imaging bursts when the outputs of the lasers 60 are directed at appropriate points opposite recording medium 50.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of the focused outputs of lasers 60 and recording medium 50 (as reported by detector 55) with the image data to actuate the appropriate laser drivers at the appropriate times during scan of recording medium 50. The driver and control circuitry required to implement this scheme is well-known in the scanner and plotter art.

The output of each of the lasers 60 is conducted, by means of an optical fiber $72_1$, $72_2$, $72_3$, $72_4$ to an alignment bench 75 that has a series of parallel grooves 77 for receiving the fibers. Bench 75, which may be fabricated from materials such as metal or silicon, is aligned with a laser crystal to direct the outputs of lasers 60 at appropriate points on the anterior face $80_f$ of laser crystal 80.

It is the emissions of crystal 80 that actually reach the recording medium 50. A first lenslet array 82 concentrates the outputs of lasers $D_1$–$D_4$ onto crystal 80, and a second lenslet array 84 concentrates the outputs from crystal 80 onto a focusing lens 85. The latter lens, in turn, demagnifies the incident beams in order to concentrate them further and draw them closer together on the surface of recording medium 50. The relationship between the initial pitch or spacing P between beams from crystal 80 and their final spacing on recording medium 50 is given by $P_f=P/D$, where $P_f$ is the final spacing and D is the demagnification ratio of lens 85. For example, the grooves 77 of bench 75 may be spaced 400 μm apart, which also determines the pitch P. If the demagnification ratio of lens 85 is 4:1, then the spots will be spaced 100 μm apart on the surface of recording medium 50.

To avoid substantial thermal crosstalk, the anterior face of the laser crystal (i.e., the side facing the pumping sources)

may be provided with a series of parallel grooves and a pair of spaced-apart metal strips extending across the anterior face of the crystal perpendicular to the grooves. The strips and grooves serve to isolate thermomechanically the regions they define, and are aligned with the pumping sources such that the pumping-source outputs strike the anterior crystal face in the centers of the regions bounded by the strips and the grooves. This arrangement is expensive to manufacture, requiring precision operations to be performed on a single crystal monolith. Furthermore, the crystal must be housed in an appropriate environment to allow contact with the metal strips so that heat may be continuously withdrawn from the crystal.

DESCRIPTION OF THE INVENTION

BRIEF SUMMARY OF THE INVENTION

In accordance with the present invention, the grooves on the laser crystal are eliminated. Instead, separate, individually addressable laser crystals are optically coupled to a single slab of an optical carrier that transmits substantially without distortion. The crystals are separate for thermomechanical isolation but may be closely spaced (generally on the order of 0.003 inch apart), and may originate as a single crystal cut into separate segments. The optical carrier acts as a heat sink and is easily coupled to a housing, which may include conduits for a cooling medium.

A representative configuration includes a plurality of radiation pumping sources; a series of closely spaced laser crystals, responsive to the pumping sources, for producing low-dispersion radiation; a transmissive carrier to which the crystals are optically coupled; and means for focusing the outputs from the crystal onto a recording surface. The crystals produce a discrete output in response to each of the pumping sources without substantial thermal crosstalk, and the outputs of the pumping sources themselves are conveyed to the crystals either directly or by means of optical fibers.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
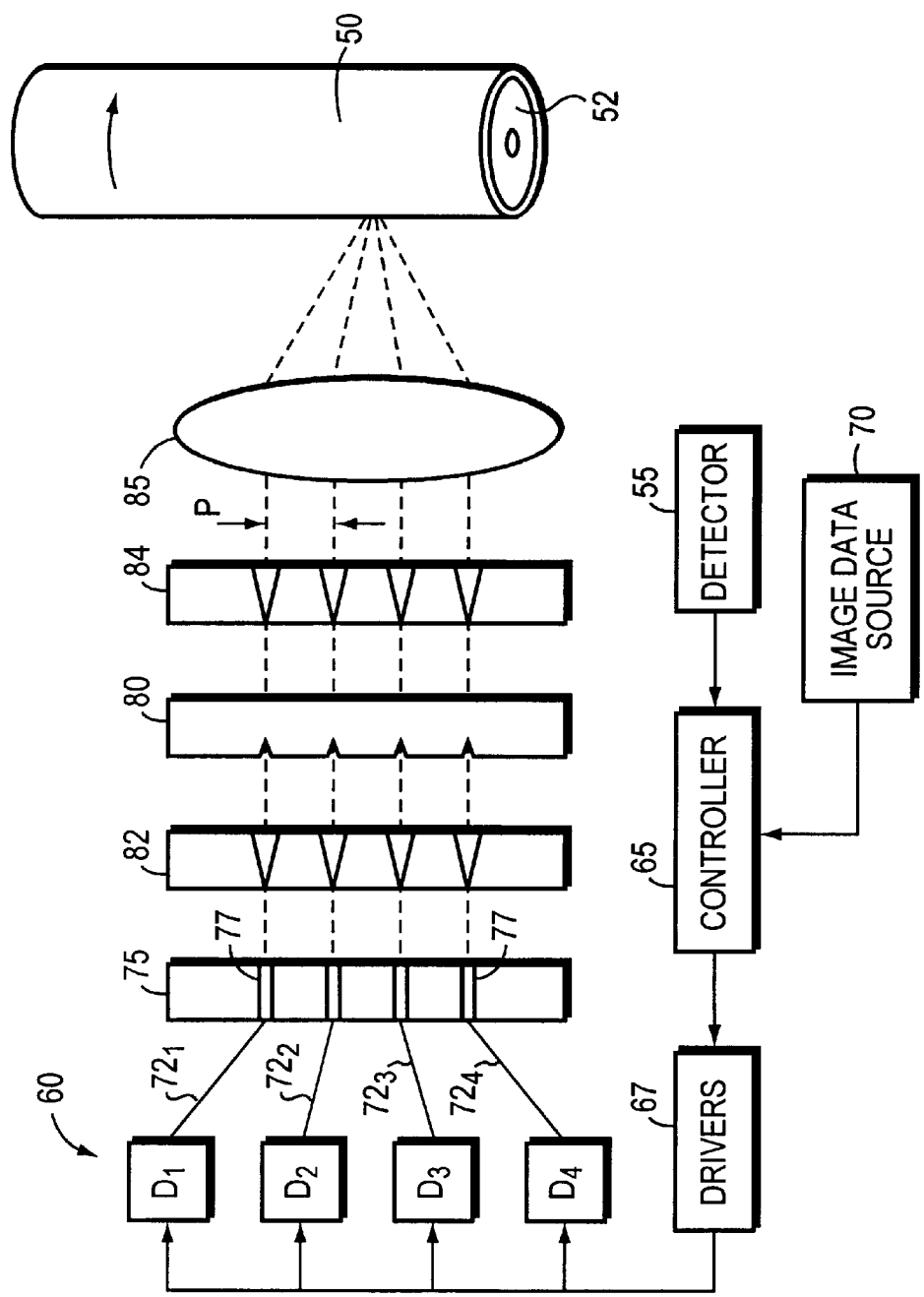
FIG. 1 schematically illustrates a prior laser-imaging configuration.
Figure 2:
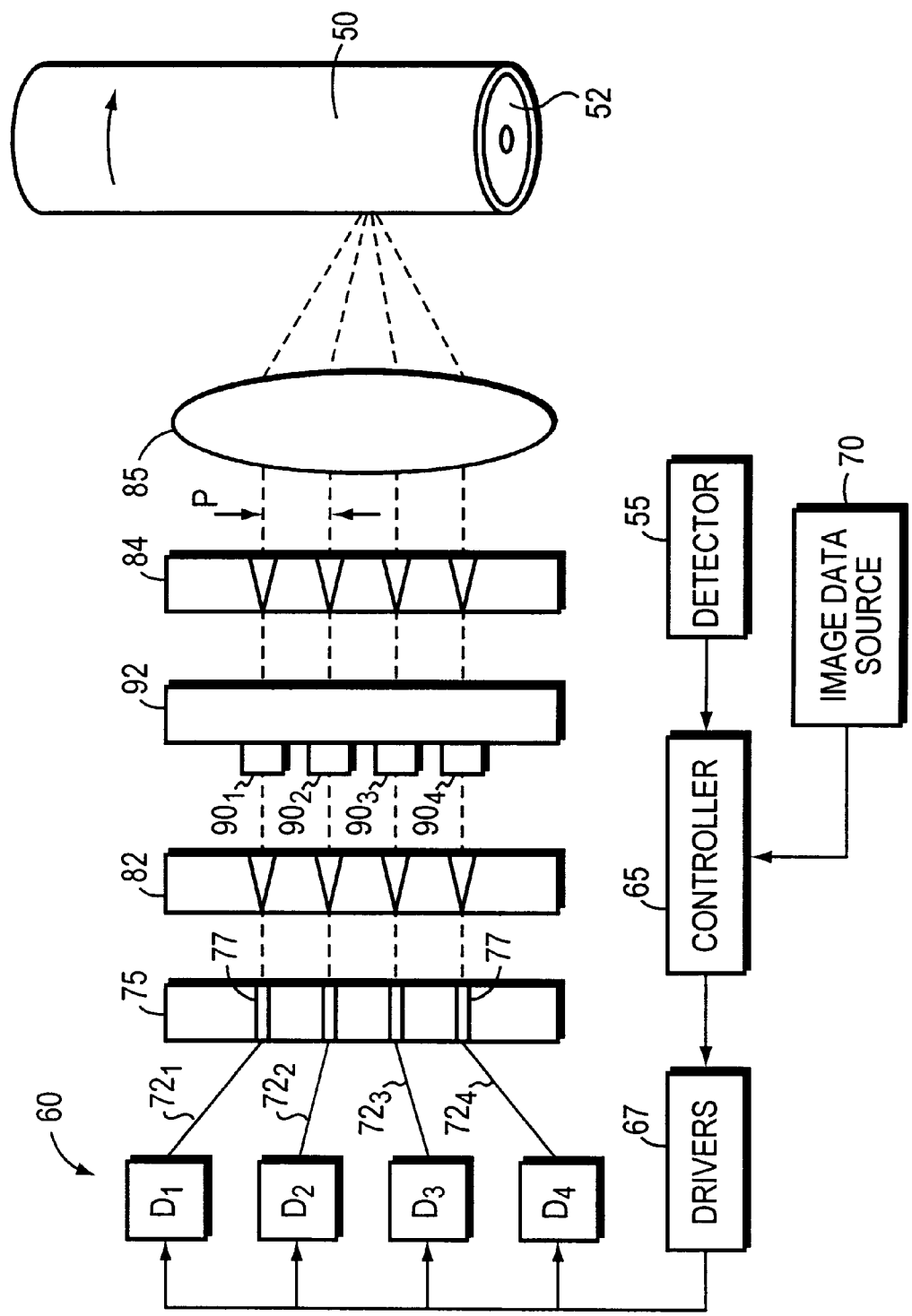
FIG. 2 schematically illustrates an imaging configuration in accordance with the present invention.

With reference to FIG. 2, four (or more) laser crystals $90_1$, $90_2$, $90_3$, $90_4$ are optically coupled to a single slab 92 of an optical carrier that transmits substantially without distortion. The crystals 90 are separate for thermomechanical isolation but may be closely spaced (generally on the order of 0.003 inch apart). For example, crystals 90 may start out as separate monoliths that are individually applied to carrier 92, or may instead be a single monthlith that is cut into sections, or some combination thereof. Optical coupling of highly polished surfaces results in a strong bond that is not defeated by cutting operations, such as sawing, so a 3-mil spacing can be achieved using a diamond saw to make cuts into a crystal monolith that has been optically coupled to carrier 92.

Carrier 92 may be any transmissive material of high optical quality; preferred materials include sapphire crystals and pure, undoped yttrium aluminum garnet (YAG) crystals. Carrier 92 also acts as a heat sink and may be mechanically coupled (e.g., soldered or otherwise bonded in a thermally conductive fashion) to a large metal fixture or other heat-dissipating structure (which may, for example, include conduits for circulation of a cooling fluid). Indeed, for further heat sinking capability, it is possible—although not ideal—to provide another carrier optically coupled to the opposite sides of crystals 90.

It is also possible to eliminate lenslet array 82 by bringing the end faces of fibers 72, as they emerge from alignment bench 75, into contact with crystals 90 so as to achieve optical coupling therebetween.

It will therefore be seen that we have developed new and useful approaches to the design and operation of multiple-beam, diode-pumped laser systems applicable to a variety of digital-imaging environments. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for imaging a laser-responsive recording construction, the apparatus comprising:

a. a plurality of radiation pumping sources;

b. a series of closely spaced laser crystals, responsive to the pumping sources, for producing low-dispersion radiation, the crystals being flat-flat monoliths and producing a discrete output in response to each of the pumping sources without substantial thermal crosstalk;

c. a transmissive carrier to which the crystals are optically coupled; and d. means for focusing the outputs from the crystals onto a recording surface.

2. The apparatus of claim 1 wherein the transmissive carrier is a sapphire slab.

3. The apparatus of claim 1 wherein the transmissive carrier is a YAG crystal.

4. The apparatus of claim 1 wherein the laser crystals have first and second posed faces, the transmissive carrier being optically coupled to the first crystal faces and further comprising a second transmissive carrier optically coupled to the second crystal faces.

5. The apparatus of claim 1 wherein the radiation pumping sources optically communicate with the laser crystals by means of optical fibers having end faces, the end faces of the optical fibers being in contact with the laser crystals.

6. A method of imaging a laser-responsive recording construction, the apparatus comprising:

a. providing a series of closely spaced laser crystals, responsive to radiation pumping sources, for producing low-dispersion radiation, the crystals being flat-flat monoliths and producing a discrete output in response to individual pumping sources without substantial thermal crosstalk;

b. optically coupling the crystals to a transmissive carrier;

c. operating a plurality of radiation pumping sources to pump the laser crystals so as to produce outputs therefrom; and d. focusing the outputs from the crystals onto a recording surface.

7. The method of claim 6 wherein the transmissive carrier is a sapphire slab.

8. The method of claim 6 wherein the transmissive carrier is a YAG crystal.

9. The method of claim 6 wherein the laser crystals have first and second opposed faces, the transmissive carrier being optically coupled to the first crystal faces and further comprising the step of optically coupling a second transmissive carrier to the second crystal faces.

10. The method of claim 6 herein the transmissive carrier absorbs heat from the laser crystals, and further comprising the step of conducting absorbed heat from the transmissive carrier.

11. The method of claim 6 wherein the laser crystals are optically coupled to the carrier according to steps comprising:
 a. applying a single crystal monolith to the carrier so as to achieve optical coupling therebetween; and
 b. cutting the monoliths into separate sections each serving as one of the laser crystals.

12. The method of claim 6 wherein the laser crystals are optically coupled to the carrier by individually applying the crystals thereto.

* * * * *